(12) United States Patent
Wu

(10) Patent No.: US 6,493,005 B1
(45) Date of Patent: Dec. 10, 2002

(54) ON SCREEN DISPLAY

(75) Inventor: Fang-Chuan Wu, Fremont, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/281,599

(22) Filed: Mar. 30, 1999

(51) Int. Cl.[7] ............................................. G06F 3/00
(52) U.S. Cl. ...................... 345/804; 345/806; 345/803; 345/781; 345/804
(58) Field of Search ........................... 364/491; 716/6; 345/326, 804, 805, 806, 803, 781, 788, 790, 783; 703/14

(56) References Cited

U.S. PATENT DOCUMENTS

| | | | | |
|---|---|---|---|---|
| 5,317,680 A | * | 5/1994 | Ditter, Jr. ..................... | 395/135 |
| 5,493,317 A | | 2/1996 | Kim .............................. | 345/213 |
| 5,642,498 A | | 6/1997 | Kutner ......................... | 395/509 |
| 5,654,738 A | | 8/1997 | Spurlock ..................... | 345/132 |
| 5,675,755 A | | 10/1997 | Trueblood ................... | 395/346 |
| 5,684,917 A | | 11/1997 | Yanagihara et al. .......... | 386/80 |
| 5,703,661 A | | 12/1997 | Wu ............................... | 348/673 |
| 5,712,946 A | | 1/1998 | Yanagihara et al. .......... | 386/80 |
| 5,724,104 A | | 3/1998 | Eom ............................. | 348/569 |
| 5,742,285 A | | 4/1998 | Ueda ............................ | 345/342 |
| 5,748,174 A | | 5/1998 | Wong et al. .................. | 345/118 |
| 5,808,901 A | * | 9/1998 | Cheng et al. ................. | 364/491 |
| 5,963,208 A | * | 10/1999 | Dolan et al. ................. | 345/357 |
| 6,204,847 B1 | * | 3/2001 | Wright ......................... | 345/346 |
| 6,310,657 B1 | * | 10/2001 | Chauvel et al. .............. | 348/569 |

OTHER PUBLICATIONS

Sony Electronics Inc., DVD Player DVP–S550D Product Information, http://www.sel.sony.com/SEL/consumer, downloaded Jun. 3, 1999, 16 pages.

* cited by examiner

Primary Examiner—Kristine Kincaid
Assistant Examiner—Mylinh Tran
(74) Attorney, Agent, or Firm—Wood, Herron & Evans, L.L.P.

(57) ABSTRACT

An on screen display (OSD) method and apparatus is provided for controlling an on screen display generator with a reduced instruction set processor to advantageously sort and link multiple OSD windows for a video display. More particularly, an on screen display (OSD) analyzes a list of OSD window starting points by sorting into the order of starting points by iteratively sorting small groups of starting points, and linking the OSD window data to correspond to the iteratively sorted starting points. Specifically, a list of eight starting points are sorted in groups of four six times (i.e., first four, last four, middle four, first four, last four, and middle four), achieving processing speed advantages.

15 Claims, 8 Drawing Sheets

ON SCREEN DISPLAY

CROSS-REFERENCE TO RELATED APPLICATIONS

This application is related to the following co-pending and commonly owned applications: U.S. Ser. No. 09/281,152, filed concurrently herewith entitled TRICK PLAYBACK OF DIGITAL VIDEO DATA, naming Cem I. Duruoz, Taner Ozcelik, Pattabiraman Subramanian, Yoshinori Shimizu and Takayuki Ishida; U.S. Ser. No. 09/281,373, filed concurrently herewith entitled DISPLAY MASTER CONTROL, naming Fang-Chuan Wu; U.S. Ser. No. 09/177,261, filed Oct. 22, 1998, entitled "METHOD AND APPARATUS FOR A VIRTUAL SYSTEM TIME CLOCK FOR DIGITAL/AUDIO/VIDEO PROCESSOR", naming Cem Duruoz, Taner Ozelik and Gong-san Yu; U.S. Ser. No. 09/177,214, filed Oct. 22, 1998 entitled "COMMAND MANAGER", naming Cem I. Duruoz, Taner Ozcelik and Pattabiraman Subramanian; and U.S. Ser. No. 09/178,803, filed Oct. 26, 1998 entitled "MANAGEMENT OF TRICK PLAYBACK OF DIGITAL VIDEO DATA", naming Cem I. Duruoz, Taner Ozcelik and Pattabiraman Subramanian, and assigned to the same assignee as this application. These applications are hereby incorporated by reference herein.

BACKGROUND

The present invention relates to the digital processing of video to be displayed on a video display, and more particularly, to control of the display pipeline on a reduced instruction set processor between decoded digital video and a display output.

Techniques for digital transmission of video promise increased flexibility, higher resolution, and better fidelity. Recent industry collaborations have brought digital video closer to reality; digital video transmission and storage standards have been generated, and consumer digital video products have begun to appear. The move toward digital video has been encouraged by the commercialization of digital technologies in general, such as personal computers and compact discs, both of which have increased consumer awareness of the possibilities of digital technology.

Personal computers, which have recently become common and inexpensive, contain much of the computing hardware needed to produce digital video, including a microprocessor/coprocessor for performing numeric calculations, input and output connections, and a large digital memory for storing and manipulating image data. Unfortunately, personal computers are not suitable for consumer digital video reception, because the microprocessor in a personal computer is a general purpose processor, and typically cannot perform the calculations needed for digital video fast enough to produce full-motion, high definition video output.

Accordingly, special purpose processors, particularly suited for performing digital video-related calculations, have been developed for use in digital video receivers for consumer applications. The first attempts in the early 1990s included separate application specific integration circuits (ASICs) for audio and for video processing. In addition, these early ASICs performed only low-level functions, and thus burdened a host processor with most of the management of the audio and video processing. These ASICs relied on standard audio/video synchronization and simple error concealment techniques all to be performed by the host processor.

Thereafter, some audio/video processing components were introduced that provided some integration of audio and video decoding with some primitive levels of features. However, these components largely shared the same drawbacks as the early ASICs in that host processors largely managed the audio and video processing.

Other audio/video processing components attempted to provide more features in a cost effective way by combining more firmware functionality onto the same integrated circuit (IC). However, such inflexible approaches narrowed applications to which such ICs could be used and narrowed the functionality when used. Design choices made in firmware constricted the Application Program Interface (API).

A more flexible approach has been made by providing a specific processor with a high-speed architecture which allows programming flexibility with its open, multi-level Application Programming Interface (API). This specific processor is disclosed in commonly-assigned, copending U.S. patent application Ser. No. 08/865,749, entitled SPECIAL PURPOSE PROCESSOR FOR DIGITAL AUDIO/VIDEO DECODING, filed by Moshe Bublil et al. on May 30, 1997, which is hereby incorporated by reference herein in its entirety, and a memory controller for use therewith is disclosed in commonly-assigned, copending U.S. patent application Ser. No. 08/846,590, entitled "MEMORY ADDRESS GENERATION FOR DIGITAL VIDEO", filed by Edward J. Paluch on Apr. 30, 1997, which is hereby incorporated herein in its entirety.

The above-referenced U.S. patent applications describe an application specific integrated circuit (ASIC) for performing digital video processing, which is controlled by a reduced instruction set CPU (RISC CPU). The RISC CPU controls computations and operations of other parts of the ASIC to provide digital video reception. As is typical of CPU's of many varieties, the CPU described in the above-referenced U.S. patent applications supports flow control instructions such as BRANCH, CALL and RETURN, as well as providing hardware interrupt services.

Due to the limitations of the RISC CPU, a number of functions are provided in the operating system rather than in hardware. A specific operating system of this kind is disclosed in commonly-assigned, copending U.S. patent application Ser. No. 08/866,419, entitled TASK AND STACK MANAGER FOR DIGITAL VIDEO DECODING, filed by Taner Ozcelik et al. on May 30, 1997, which is hereby incorporated by reference herein in its entirety; and software running under control of this operating system for controlling high-level digital video decoding functions is described in U.S. patent application Ser. No. 09/177,214 entitled "COMMAND MANAGER" filed by Cem I. Duruoz et al. on Oct. 22, 1998, which is hereby incorporated by reference herein in its entirety; and U.S. patent application Ser. No. 09/177,261 entitled METHOD AND APPARATUS FOR A VIRTUAL SYSTEM TIME CLOCK FOR DIGITAL/AUDIO/VIDEO PROCESSOR filed by Cem I. Duruoz et al. on Oct. 22, 1998, which is hereby incorporated by reference herein in its entirety. Thus, certain functions like scheduling audio/video processing and synchronization such processes are handled by a digital audio/video processor, unburdening a host processor, while providing intimate control of such processes by the host when desirable.

One aspect of the aforementioned digital audio/video processor is accommodating various digital video formats. For instance, the industry sponsored Motion Pictures Expert Group (MPEG) chartered by the International Organization for Standardization (ISO) has specified a format for digital video and two channel stereo audio signals that has come to be known as MPEG-1, and, more formally, as ISO-11172.

MPEG-1 specifies formats for representing data inputs to digital decoders, or the syntax for data bitstreams that will carry programs in digital formats that decoders can reliably decode. In practice, the MPEG-1 standards have been used for recorded programs that are usually read by software systems. The program signals include digital data of various programs or program components with their digitized data streams multiplexed together by parsing them in the time domain into the program bitstreams. The programs include audio and video frames of data and other information. MPEG-1 recordings may be recorded on an optical disk and referred to as a Video Compact Disc, or VCD.

An enhanced standard, known colloquially as MPEG-2 and more formally as ISO-13818, has more recently been agreed upon by the ISO MPEG. Products using MPEG-2 are often provided on an optical disk referred to as a Digital Video Disc, or DVD. This enhanced standard has grown out of needs for specifying data formats for broadcast and other higher noise applications, such as high definition television (HDTV), where the programs are more likely to be transmitted than recorded and more likely to be decoded by hardware than by software. The MPEG standards define structure for multiplexing and synchronizing coded digital and audio data, for decoding, for example, by digital television receivers and for random access play of recorded programs. The defined structure provides syntax for the parsing and synchronizing of the multiplexed stream in such applications and for identifying, decoding and timing the information in the bitstreams.

The MPEG video standard specifies a bitstream syntax designed to improve information density and coding efficiency by methods that remove spacial and temporal redundancies. For example, the transformation of blocks of 8×8 luminance pels (pixels) and corresponding chrominance data using Discrete Cosine Transform (DCT) coding is contemplated to remove spacial redundancies, while motion compensated prediction is contemplated to remove temporal redundancies. For video, MPEG contemplates Intra (I) frames, Predictive (P) frames and Bidirectionally Predictive (B) frames. The I-frames are independently coded and are the least efficiently coded of the three frame types. P-frames are coded more efficiently than are I-frames and are coded relative to the previously coded I- or P frame. B-frames are coded the most efficiently of the three frame types and are coded relative to both the previous and the next I- or P-frames. The coding order of the frames in an MPEG program is not necessarily the same as the presentation order of the frames. Headers in the bitstream provide information to be used by decoders to properly decode the time and sequence of the frames for the presentation of a moving picture.

The video bitstreams in MPEG systems include a Video Sequence Header containing picture size and aspect ratio data, bit rate limits and other global parameters. Following the Video Sequence Header are coded groups-of-pictures (GOPs). Each GOP usually includes only one I-picture and a variable number of P- and B-pictures. Each GOP also includes a GOP header that contains presentation delay requirements and other data relevant to the entire GOP. Each picture in the GOP includes a picture header that contains picture type and display order data and other information relevant to the picture within the picture group.

Each MPEG picture is divided into a plurality of macroblocks (MBs), not all of which need to be transmitted. Each MB is made up of 16×16 luminance pels, or a 2×2 array of four 8×8 transformed blocks of pels. MBs are coded in Slices-of consecutive variable length strings of MBs, running left to right across a picture. Slices may begin and end at any intermediate MB position of the picture but must respectively begin or end whenever a left or right margin of the picture is encountered. Each Slice begins with a Slice Header that-contains information of the vertical position of the Slice within the picture, information of the quantization scale of the Slice and other information such as that which can be used for fast-forward, fast reverse, resynchronization in the event of transmission error, or other picture presentation purposes.

The macroblock is the basic unit used for MPEG motion compensation. Each MB contains an MB header, which, for the first MB of a Slice, contains information of the MB's horizontal position relative to the left edge of the picture, and which, for subsequently transmitted MBs of a Slice, contains an address increment. Not all of the consecutive MBs of a Slice are transmitted with the Slice.

Video images to be viewed by a user are normally produced in a known manner by a scanning process across a video display. The choice of a particular scanning process to be used is generally a design trade off among contradictory requirements of bandwidth, flicker, and resolution. For normal television viewing, generally, an interlaced scanning process uses frames that are composed of two fields sampled at different times. Lines of the two fields are interleaved such that two consecutive lines of a frame, that is, a full display, belong to alternate fields. An interlaced scanning process represents a vertical temporal trade off in spatial and temporal resolution. Thus, slow moving objects are perceived with higher vertical detail, while fast moving objects are perceived with a higher temporal rate, although at half the vertical resolution.

The presentation of MPEG video involves the display of video frames at a rate of, for example, twenty-five or thirty frames per second (depending on the national standard used, PAL or NTSC, for example). Thirty frames per second corresponds to presentation time intervals of approximately 32 milliseconds. Thus, MPEG-2 video decoders must decode signals with interleaved video in what has been called, and referred to above as, the CCIR-601 (and which has also been called the ITU-R) color video format, where each pixel is coded as a luminance 8 bit value sampled at a 13.5 MHZ rate along with a red chrominance value and a blue chrominance value, 8 bits each and sampled at a 6.75 MHZ rate. In this format, the video frames are 720 pels per line, and either 480 lines per frame at 30 frames per second or 576 lines per frame at 25 frames per second.

It is also known, pursuant to the MPEG-2 standard, that different video formats may be utilized in order to reduce the amount of data required. MPEG-2 video coding is optimized for the CCIR-601 4:2:2 interlaced format and, therefore, the 4:2:2 interlaced format is normally used in decoding video signals. In an MPEG-2 4:2:0 video format, the number of samples of each chrominance component, Cr or Cb, is one-half the number of samples of luminance, both horizontally and vertically. In contrast, with the MPEG-2 4:2:2 video format, in each frame of video, the number of samples per line of each chrominance component, Cr or Cb is one-half of the number of samples per line of luminance. However, the chrominance resolution is full vertically, that is, it is the same of that of the luminance resolution vertically. In the normal course of video signal processing, the 4:2:0 format is used, and that format is interpolated to a 4:2:2. format for the video display monitor.

In addition to the above variations, a video signal processor must be able to process video that has been derived from a wide range of sources. For example, the program material may be derived from 16 mm, 35 mm, or 70 mm film, cinemascope film, or wide screen film. Each of those film sources has a different display size, which is often calibrated in terms of its image aspect ratio, that is, the ratio of picture width to height. For example, the aspect ratio of 16 mm film, wide screen film, 70 mm film, and cinemascope film are 1.33, 1.85, 2.10, 2.35, respectively. The aspect ratio of NTSC, PAL, and SECAM TV is 1.33, whereas the aspect ratio for HDTV is 1.78. Given those variations in aspect ratio in combination with different sizes of video displays, it is often required to adjust the horizontal width or vertical height of the displayed image. Thus, the video signal processor must be capable of driving display monitors such that images having different aspect ratios may be displayed.

Many of the aforementioned video display capabilities provide an opportunity for flexible control of the digital audio/video processor. Full utilization of such capabilities requires user interaction. Hardware controls such as remote controls or controls on a video display controller such as a set-top cable box allow only simple, predetermined user inputs. Consequently, on screen programming is generally used to implement a menu driven user interface and/or other graphical user interface depictions to expand such interaction in an intuitive fashion.

Limitations of such on screen displays (OSD) are that generally the number of OSD windows are extremely limited, such as one at a time, with only one predetermined color pallette available. Data that can be presented in an OSD window is typically limited to text data. In addition, the host is required to generate and blend such OSD windows into the encoded video signal output to the video display. Having more than one OSD window to display at one time is made difficult because of the requirements that data for properly ordering the OSD windows in the order encountered during displaying.

SUMMARY

In accordance with the principles of the present invention, these difficulties are overcome by a novel on screen display (OSD) method and apparatus for controlling an on screen display generator with a reduced instruction set processor to advantageously sort and link multiple OSD windows for a video display. Thus, a host processor can create data for multiple OSD windows, yet not be burdened with sorting the OSD windows for the appropriate order to accommodate the order required.

More particularly, an on screen display (OSD) analyzes a list of OSD window starting points by sorting into the order of starting points by iteratively sorting small groups of starting points, and linking the OSD window data to correspond to the iteratively sorted starting points. Specifically, a list of eight starting points are sorted in groups of four six times (i.e., first four, last four, middle four, first four, last four, and middle four). If more than eight starting points are provided, additional lists of eight are similarly sorted in groups of four six times and merge sorted with the other iteratively sorted first list of eight.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention, and, together with a general description of the invention given above, and the detailed description of the embodiments given below, serve to explain the principles of the invention.

DETAILED DESCRIPTION OF SPECIFIC EMBODIMENTS

Digital Audio/Video Processor

Figure 1:
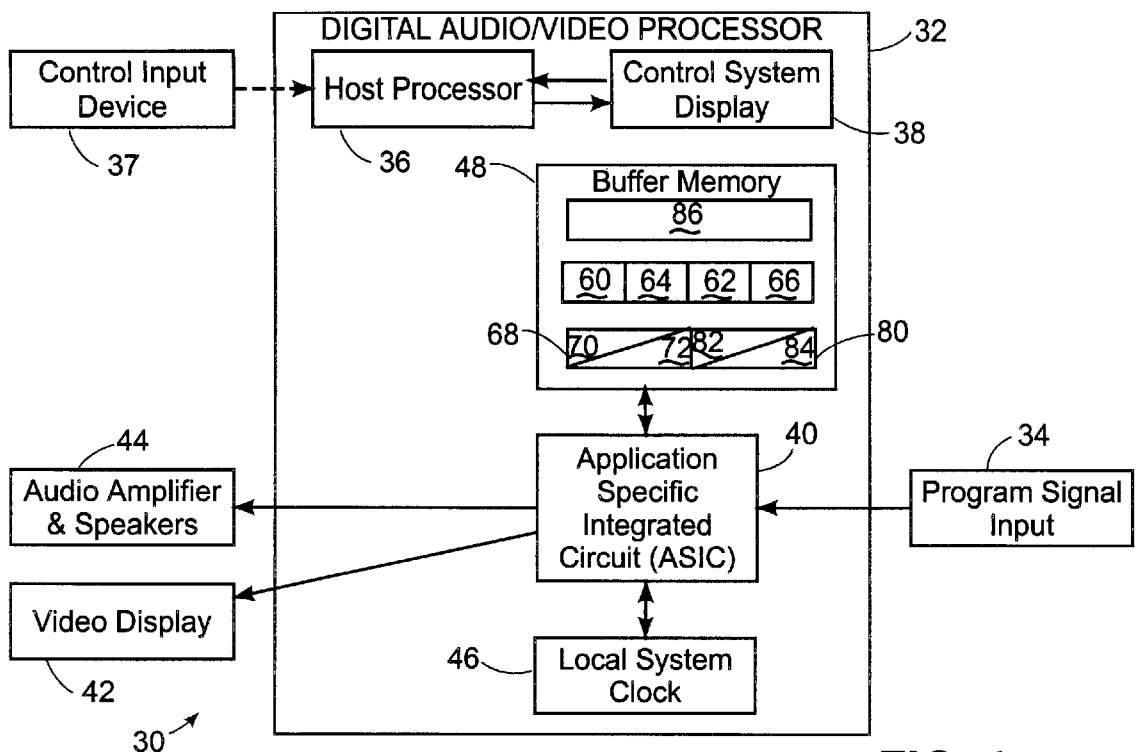
FIG. 1 is a schematic block diagram of a digital audio/video processor in accordance with the principles of the present invention.

One embodiment of the present invention is for use in a digital versatile disc ("DVD") digital audio/video processor. FIG. 1 diagrammatically represents an audio and video presentation system which includes a digital audio/video processor 32 with a program signal input 34 in the form of an antenna, a cable, DVD, CD ROM or other medium through which a digital input signal, such as MPEG-2, is received. A host processor 36 which is programmed to process user commands from a control input device 37 operates a control system display 38 which displays information, menu selections and other information to the user and which may or may not also function as an input device. An Application Specific Integrated Circuit ("ASIC") 40, when provided with configuration and selection information by the host processor 36, decodes the raw signal from program signal input 34 for output to a video display 42 and an audio presentation device such as audio amplifier and speakers 44. A local system clock 46 preferably is connected to the ASIC 40 and a buffer memory 48. The buffer memory 48 is an in-line, sequential memory, such as dynamic random access or DRAM memory.

In accordance with known decoding techniques, decoded luminance data is stored in the buffer memory 48 as full frame I or P pictures in buffer portions 60, 62, respectively.

Similarly, decoded chrominance data is stored in the buffer memory 48 as full frame I or P pictures in buffer portions 64, 66, respectively. The order of storage of the screen data in the buffers 60–66 begins at the upper left corner of the screen and each line is stored from the top to the bottom of the screen.

In the case of B-pictures, one field of luminance (luma) data of the picture is reconstructed at a time and stored in one half of a buffer 68. Two halves 70, 72 of the buffer 68 respectively store the luminance values in alternate top and bottom fields. The buffer 68 is configured as a circular buffer with the two halves 70, 72 thereof overlapping so that the size of the buffer 68 is slightly larger than one of the whole field portions 70, 72 of the buffer 68. When either of the buffer halves 70 or 72 contains a complete reconstructed field, its size will be 0.50 of a full frame, and the buffer 70 or 72 containing the field will store the field data until the field is ready for display. In a similar manner, one field of chrominance (chroma) data of a B frame picture is reconstructed at a time and stored in one half of a buffer 80. Two halves 82, 84 of the buffer 80 respectively store the chrominance data values for alternate top and bottom fields. Also stored in buffer memory 48 are a current base address register 86, with the first 16 bits providing the base address for Luma and the last 16 bits providing the base address for Chroma.

Video output and post-filtering can take place from either B-field buffers 68, 80 or from the I or P-frame buffers 60–66. The output and post-filtering from I or P-frame buffers takes place one field at a time, with odd or even rows being read from the buffer 60–66, depending on whether bottom or top field is being filtered and displayed. Within the chrominance memory sections of the buffer memory 48, the video data is normally stored in a 4:2:0 format; and therefore, there is one sample per line of U, V chrominance pairs for every two samples per line of Y luminance data. The details of how the decoded video data is stored in memory are further described in copending and commonly assigned applications Ser. No. 09/001,122, MOTION COMPENSATED DIGITAL VIDEO DECODING WITH BUFFER MEMORY ADDRESSING THEREFOR and Ser. No. 09/001,129 entitled MOTION COMPENSATED DIGITAL VIDEO DECODING WITH BUFFERED PICTURE STORAGE MEMORY MAP, both filed on Dec. 30, 1997, which applications are in their entirety hereby expressly incorporated by reference herein.

Application Specific Integrated Circuit (ASIC)

Figure 2:
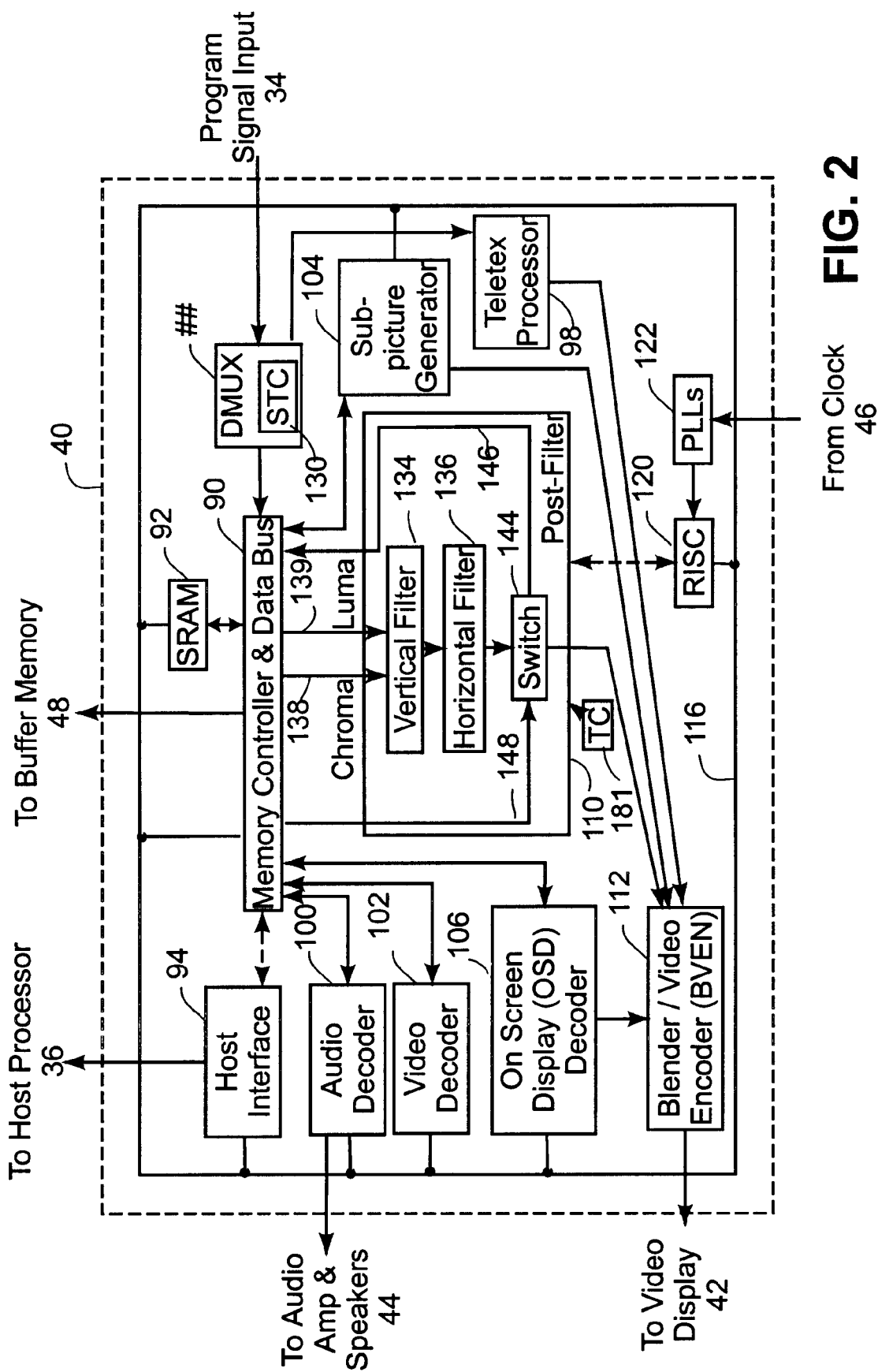
FIG. 2 is a schematic block diagram of an ASIC device within the digital audio/video processor of FIG. 1.

Referring to FIG. 2, the ASIC 40 is a single integrated circuit chip that is logically divided into a number of components or functions. The ASIC 40 includes a memory control and data bus 90, which has at least one received data input connection and a plurality of two-way data flow connections. One of the two-way connections is to a static random access memory ("SRAM") 92 of the ASIC 40. Another of the two-way connections is to a host interface unit 94 which connects externally with the host processor 36, and another is to the buffer memory 48 which is external to the ASIC 40. The ASIC 40 includes a demultiplexer or DMUX 96 which has an input connected to the program signal input 34 and an output connected to the received data input of the bus 90. The DMUX 96 has a text output connected to a teletex processor 98, that is also provided on the ASIC 40 for processing collateral information such as closed caption script and other such data.

The ASIC 40 further includes an audio digital signal processing ("DSP") decoder 100, a video decoder 102, a subpicture generating unit 104, and an on screen display decoder 104. The audio decoder 100 has an input side connected to one of the two-way data connections of the bus 90 and an output connected to audio amplifier and speakers 44. The video decoder 102 receives video data via another of the two-way data connections of the bus 90, decodes and otherwise processes the received video data, and sends the decoded and partially processed video picture data back through bus 90 to the buffer memory 48. This processing preferably includes the application of motion compensation calculations and the construction of B-picture fields from buffered I and/or P frames and received B-picture data.

The subpicture generating unit 104 generates local picture information that includes control menus, display bar-graphs, captions, subtitles, karaoke or simple animation and other indicia used in interaction with the user. When a change of aspect ratio is required in the vertical direction, decoded video data stored in the buffer memory 48 is processed by a post filter 110. The post filter 110 is hardware that implements a finite impulse response ("FIR") filter with downloadable coefficients that can either decimate or interpolate lines of video data in the active area of a frame in selectable ratios, for example, a 4:3 ratio. Normally, during the decoding process, video data is supplied from buffer memory 48 via filter 110 to a blender/video encoder 112. The blender/video encoder 112 combines the program or main video with local video from the subpicture unit 104 and/or with teletex information from the teletex processor 98. The output of the blender/video encoder 112 is connected to the video display 42.

Figure 3:
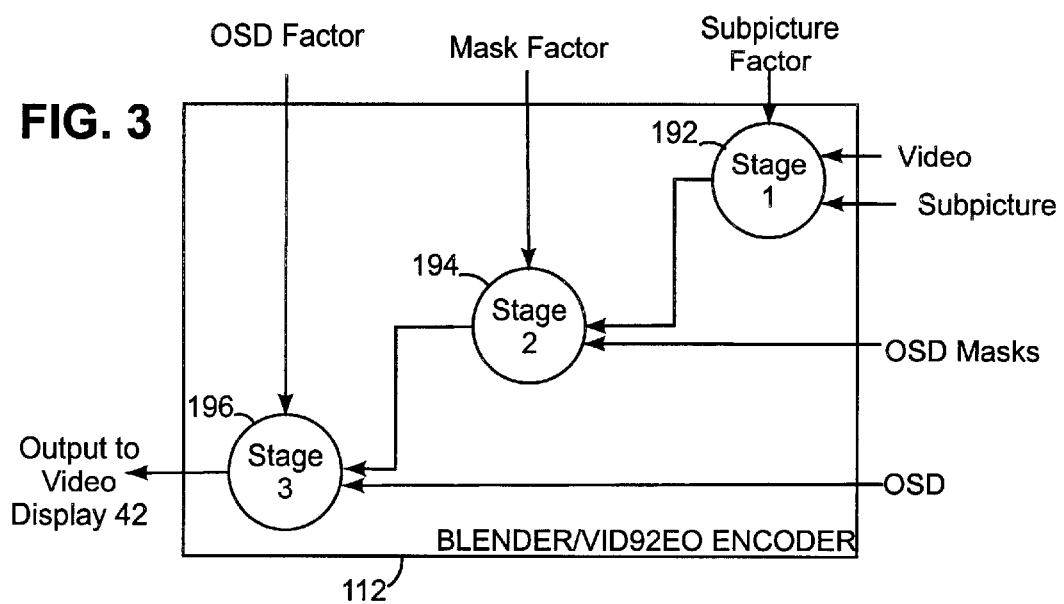
FIG. 3 is a three stage blender/video encoder of FIG. 2, merging video, subpicture, and OSD display data for display.

Referring to FIG. 3, the blender/video encoder 112 is shown blending the aforementioned inputs in three stages. In stage 1 (192), the video signal from the post filter 110 is combined with the subpicture signal from the subpicture generator 104 as a function of a subpicture factor from the OSD decoder 106. The subpicture factor allocates what proportion of the signal to each pixel of the video display 42 is based on the video and what proportion is based on the subpicture. The output of stage 1 (192) is blended in stage 2 (194) with OSD masks provided by the OSD decoder 106 proportioned by mask factor from the OSD decoder 106. The OSD decoder 106 provides eight rectangular masks for graphics and special features like fade in/out. The host 162 can control the mask area, color and blending factor. The output of stage 2 (194) is blended in stage 3 (196) with OSD data from the OSD decoder 106 proportioned by an OSD factor from the OSD decoder 106. The output of stage 3 (196) goes to the video display 42.

Returning to FIG. 2, the ASIC 40 is provided with a control bus I 16 which is connected to the components in the ASIC 40. The ASIC 40 is also provided with a Reduced Instruction Set Controller ("RISC") 120, which serves as the local central processing unit (CPU) of the ASIC 40. The RISC 120 controls the functions of the components of the ASIC 40 through control data ports connected to the control bus 116. The RISC 120 has a clock input to the local system clock 46 implemented as a phase locked loop circuitry ("PLL") 122 within the ASIC 36 used to time internal clock signals.

Audio, video and subpicture data packets are received and demultiplexed continuously in independent parallel data streams. The decoding and playback of output frames of audio, video and subpicture data is also performed continuously in parallel data streams independent of the demultiplexing processes. Demultiplexing is a process that varies significantly in real time, depending on the nature of audio, video and subpicture data being received. In addition, the number of video frames to be presented and their order of presentation cannot be determined from the raw video data being received. The creation of video frames and their order of presentation is a function of the decoding process and is determined primarily by the control data in the header portion of the video data packet. Similarly, the raw audio data being received in the data packet bears little resemblance to the audio data output and presented, and the frames of audio data to be presented are created during the decoding process of the audio data. The subpicture data is received in a series of one or more data packets that include display control sequence ("DCSQ") commands each of which has its own start time ("STM") value. A subpicture unit ("SPU") is defined by the subpicture data occurring between subpicture data packets having a presentation time stamp ("PTS") value. The intermediate subpicture data packets contain additional DCSQ command data.

It should be noted that output audio frames can be of any length in real time, and further, several audio frames may be associated with single video frame, or in contrast, a single audio frame may be presented during video produced by several video frames. However, it is required that the frames of audio and video be played back in a synchronized manner to provide a coordinated and coherent presentation to the user. To facilitate the coordination of the presentation of the frames of audio and video data, selected ones of the audio and video data packets contain a PTS value, which is a time reference to a system counter that was running during the creation or recording of the audio and video data. A similar system time clock ("STC") 130 is maintained and clocked in real time by the DMUX 96; and during the demultiplexing process, audio, video and subpicture PTS values are stored in respective PTS tables. During the standard decoding and playback, the audio and video PTS values in the tables are compared to the STC times; and when a PTS value is equal to or less than the STC time, the respective audio, video and subpicture data is read from memory, decoded and played at a time and in a sequence that conforms to how the data was recorded on the DVD.

With respect to the subpicture, the RISC 120 decodes the DCSQ commands in the subpicture during the vertical blanking period, that is, with each vertical sync period ("fid"). Upon determining the appropriate DCSQ command to be executed, the RISC 120 provides first command data, for example, subpicture location data and color and contrast data to the subpicture generator 104 and further causes subpicture pixel data and other subpicture command data, for example, a Change Color-Contrast ("CHG_COLCON") command to be provided to the subpicture generator 104 from buffer memory 48. The RISC 120 also causes the pixel data for the video to be sequentially provided from the buffer memory 48 to the blender/video encoder 112. Simultaneously therewith, the subpicture generator 104 provides, if appropriate, subpicture pixel data to the blender/video encoder 112. The blender/video encoder 112 utilizes a known process, for example, a mixing process, to mix the. subpicture pixels with the video pixels from buffer memory 48 and produce the desired mixed or blended video data. The blended video data is then encoded in accordance with a desired standard, for example, an NTSC or PAL standard; and thereafter, the encoded video data is converted to an analog signal and displayed on the video display unit 42.

The post filter 110 provides the display engine for the ASIC 40 with two independent filters: a vertical filter 134 and a horizontal filter 136. The vertical filter 134 receives decoded 4:2:0 data from the data bus 90 in a post filter Chroma channel 138 and Luma channel 139 for vertical resizing and/or chroma interpolation to 4:2:2 data. Then the 4:2:2 data from the vertical filter 134 is received by the horizontal filter 136 for horizontal resizing, if required. Then the post filter 110 routes the resultant data to the blender/video encoder 112 as discussed above, with such destination termed "real-time mode." Alternatively, a switch 144 interposed between the horizontal filter 142 and the blender/video encoder 112 can be switched to a "multi-picture mode," whereby the resultant data is routed back to the memory controller and data bus 90, as shown by YUV_WR channel 146. Similarly, the switch 144 turns on a YUV_RD channel 148 to get 4:2:2 data from the buffer memory 48 and to output the 4:2:2 data to the blender/video encoder 112, completing a data write-back process for non-real-time video applications such as jacket pictures and angle pictures provided by MPEG2 controller pre-horizontal synchronization interrupt (TC_pre_hsync) 180 and timing controller horizontal synchronization interrupt (TC_hsync) 182. These two routines perform the line based control, including display active area control, buffer memory 48 addresses update, and post filter 110 rbus registers update. Basically, TC_pre_hsync 180 performs the calculations and TC_hsync 182 program the rbus registers.

The implementation of the display state machine 178 and display line control 176 is further described in copending provisional and commonly assigned application Ser. No. 60/126,810 FILTERING CONTROL, by Sabya Dutta, filed on Mar. 30, 1999, which application is in its entirety hereby expressly incorporated by reference herein.

Alternatively, efficiency can be achieved by the DIMC calculating all parameters once per field, rather than calling a separate state machine. The DLC can then quickly access the data without running the state machine. The DIMC performs these calculations in blocks 272 or 274 and also in block 276, all shown in FIG. 5.

Display Master Control (DIMC)

Figure 5:
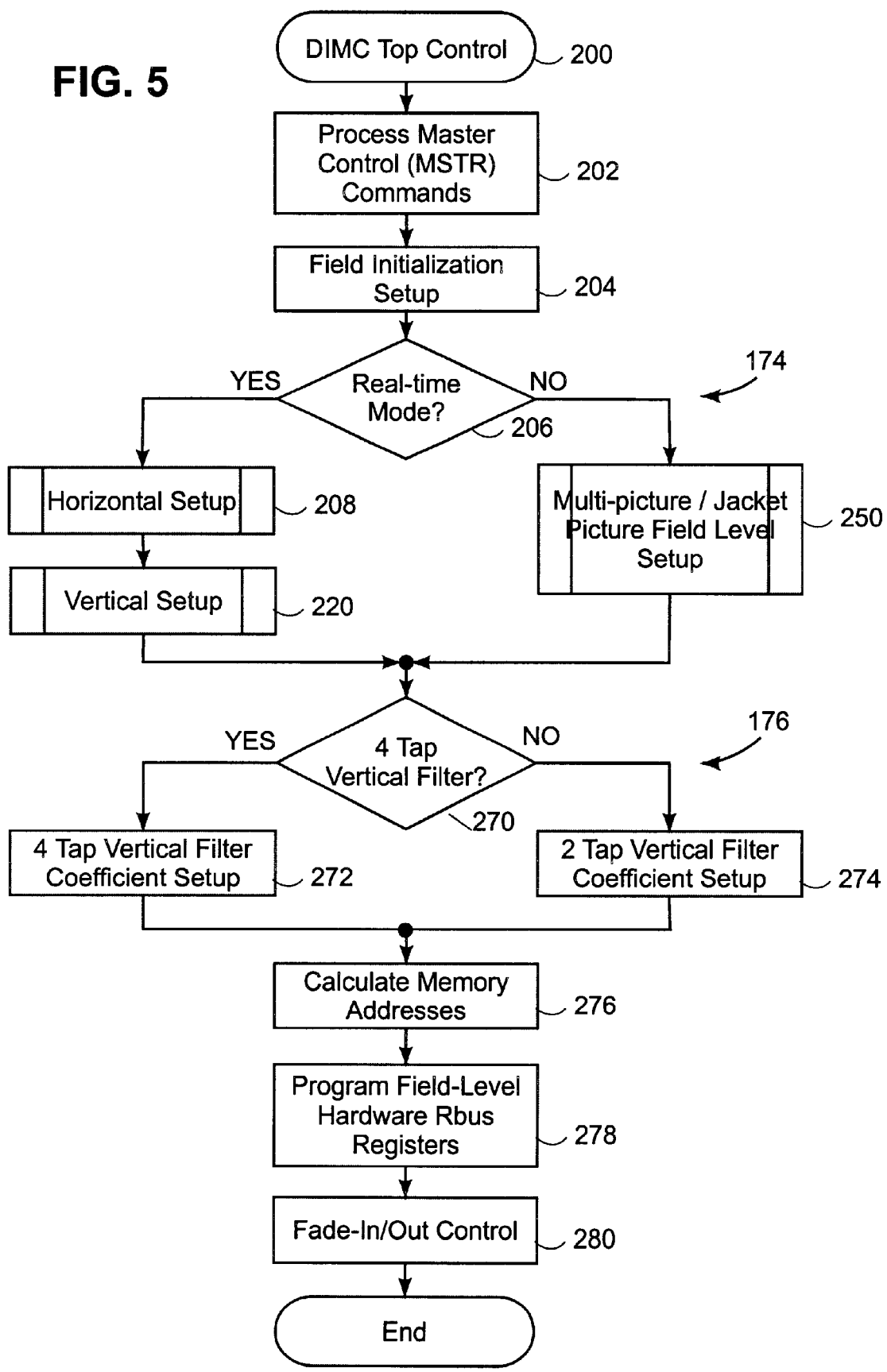
FIG. 5 is a flow chart illustrating the steps of a top control routine of the display master control shown in FIG. 4.

Referring to FIG. 5, a display master control (DIMC) top control routine 200 for performing field-level control of the post filter 110, includes field/frame filtering display with up a four-tap multi-phase filter, MPEG1 standard image format (SIF) interpolations, on-the-fly aspect ratio switch, on-the-fly letter box and pan scan switch, video fade-in/out, multiple picture/jacket picture display, and multiple angle-picture display.

First, routine 200 processes master control commands (block 202), including directing the 4:2:0 or 4:2:2 data from the appropriate buffer to the post filter as well as the other parameters discussed above. Then field initialization is setup (block 204) by receiving base addresses of Luma and Chroma from registers in the buffer memory 48. program input signals. Also, a timing controller 181 provides timing signals to the post filter 110, as will be described.

Figure 4:
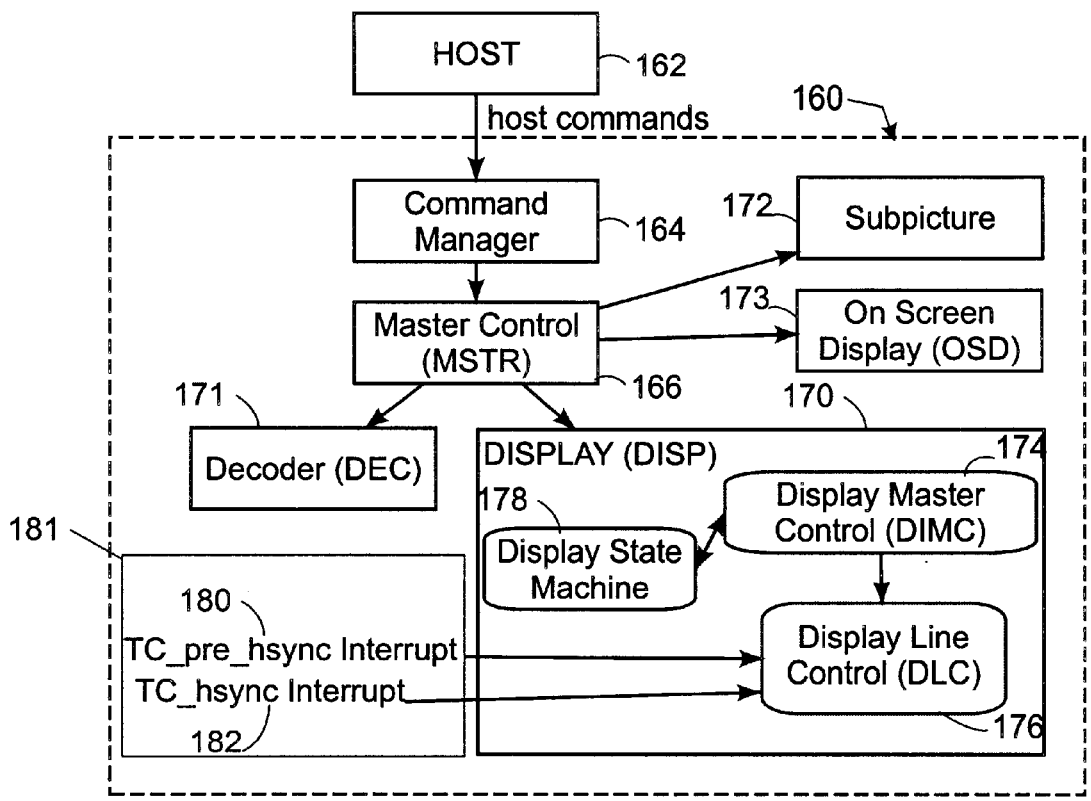
FIG. 4 is a block diagram depicting a data flow in a display pipeline formed within the ASIC device of FIG. 2.

Referring to FIG. 4, a flow diagram illustrates functional relationship of software components of display pipeline 160. Commands affecting display master control originate in host 162 which are received and scheduled by command manager 164 for implementation by master control 166. The master control 166 decides which buffer to display by passing a buffer number to a display function 170 for the post filter 110. The master control 166 also provides commands to a decoder control 171 for the video decoder 102, keeping decoded data ready in buffer memory 48 for the post filter 110. The master control 166 further provides commands to a subpicture controller 172, a software object controlling the subpicture generator 104, and to an on screen display (OSD) software object 173, controlling the OSD generator 106.

Within the display control 170, a display master control (DIMC) 174 provides field-level control to a display line control (DLC) 176 which in turn provides scan line control. In addition to knowing what buffer number was commanded by master control 166, the display master control 174 also has to obtain other display parameters from the master control 166, including: (a) display mode (e.g., normal, letter box, pan-scan, wide); (b) display sizes; (c) filtering mode (e.g., frame, field); (d) bit stream type (e.g., MPEG1, MPEG2); television system format (e.g., NTSC, PAL); and (f) video mode (e.g., real-time, multi-picture). The master control 166 may obtain these parameters from the decoded bit stream of data or from host commands. According to these inputs, the display master control 174 has to run a display state machine 178 during each vertical blanking period to fill required hardware hard codes and software parameters into caches and registers in the RISC 120. The display line control 176 receives two interrupt service routines (ISR) from timing controller 181: timing Then a determination is made as to whether real-time mode is selected (block 206). In real-time mode, the display master control 174 and display line control 176 turn on chroma and luma channels 138, 139 to get the 4:2:2 data so that the post filter 110 can filter in both vertical and horizontal domains. The output data will be sent to the blender/video encoder 112. There is no data write-back to the buffer memory 48 and YUV_WR and YUV_RD channels 146, 148 are disabled.

If in block 206 real-time mode is selected, then, horizontal setup is performed (block 208) whereby the display master control top control 200 extracts the picture horizontal size.

Figure 6:
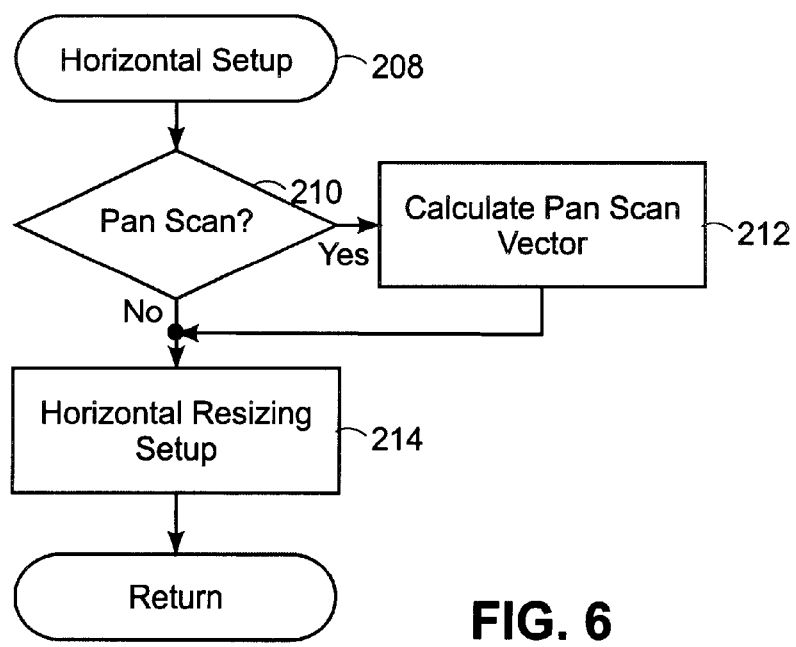
FIG. 6 is a horizontal setup routine for real-time mode referenced in the top control routine of FIG. 5.

Referring to FIG. 6, the horizontal setup routine 208 first determines whether pan scan mode has been selected, without regard to the aspect ratio (block 210). If so, the display master control calculates a pan scan vector for appropriately centering the displayed portion (block 212). To do this, the display master control 174 first priority is then to obtain the desired pan scan vector from a host parameter forwarded by master control 166. If unavailable, the display master control 174 attempts to obtain the pan scan vector from the elemental bit stream. If also not available, then display master control 174 will pan the center portion. For MPEG2 program input signals, pan scan is allowable for horizontal sizes of 720 or 704. Thus, pan scan selection for other sizes is ignored.

If pan scan was not selected in 210 or after calculating the pan scan vector in block 212, then horizontal resizing is setup (block 214). Thus, the horizontal size is expanded to fit the available horizontal dimension of 720 or 704. For example, for data with horizontal size of 352, interpolation is made to 704 by a ratio of 2/1. In the pan scan case, 544 or 540 data will be interpolated to 720 or 704, respectively, by the ratio 4/3. Once this resizing is decided, block 214 programs three rbus registers in the RISC 120 for post filter display time, luma phase delta, and chroma phase delta. Then routine 208 returns to routine 200 of FIG. 5.

Figure 7:
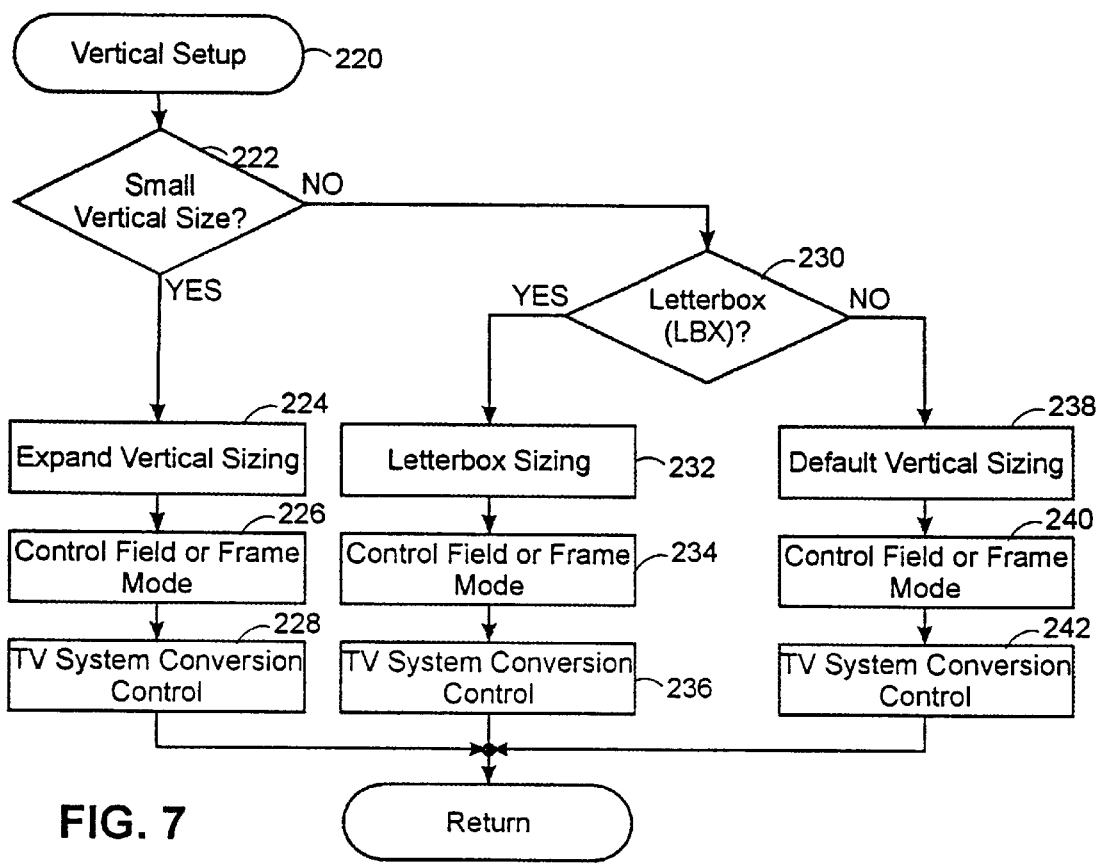
FIG. 7 is a vertical setup routine for real-time mode referenced in the top control routine of FIG. 5.

Referring to FIG. 5, after horizontal setup in block 208, then vertical setup is performed (block 220), as shown in more detail in FIG. 7. First, a determination is made as to whether the vertical size is small (block 222), that is, a standard image format of 352×240 (NTSC) or 352×288 (PAL) by testing whether the vertical size is 288 or smaller. If so, then the vertical size is expanded by interpolating such as 2/1 (block 224). Then, frame filtering is commanded if the current picture is progressive or field filtering if an interlaced picture (block 226). Then, television system conversion control occurs for the appropriate standard size of 704×480 (NTSC) or 704×576 (PAL) (block 228). After which, routine 220 returns to routine 200 on FIG. 5.

In addition to the progressive video bitstream described above, the host can force the DIMC to display field/frame filtering no matter what type of video bitstream is present. For instance for a "pause" function, some motion in the video will be apparent if there is motion between the two interlaced fields. Consequently, the host can command the DIMC to display a field resolution picture, using the bottom field, applying different filtering phases to display the top and bottom fields to remove the motion.

However, if in block 222 of FIG. 7 the vertical size was not small, then a determination is made as to whether letter box is warranted (block 230), and if so, letter box sizing is performed (block 232) by performing a 4 to 3 decimation. Then, frame filtering is commanded if the current picture is progressive or field filtering if an interlaced picture (block 234). Then television system conversion control occurs for the appropriate standard size of 704×480 (NTSC) or 704×576 (PAL) (block 236) if the video bitstream and user's television system are different. After which, routine 220 returns to routine 200 on FIG. 5.

However, if in block 230 of FIG. 7 letter box was not warranted, then default vertical sizing is performed (block 238). Then, frame filtering is commanded if the current picture is progressive or field filtering if an interlaced picture (block 240). Then television system conversion control occurs for the appropriate standard size of 704×480 (NTSC) or 704×576 (PAL) (block 242). After which, routine 220 returns to routine 200 on FIG. 5.

Figure 8:
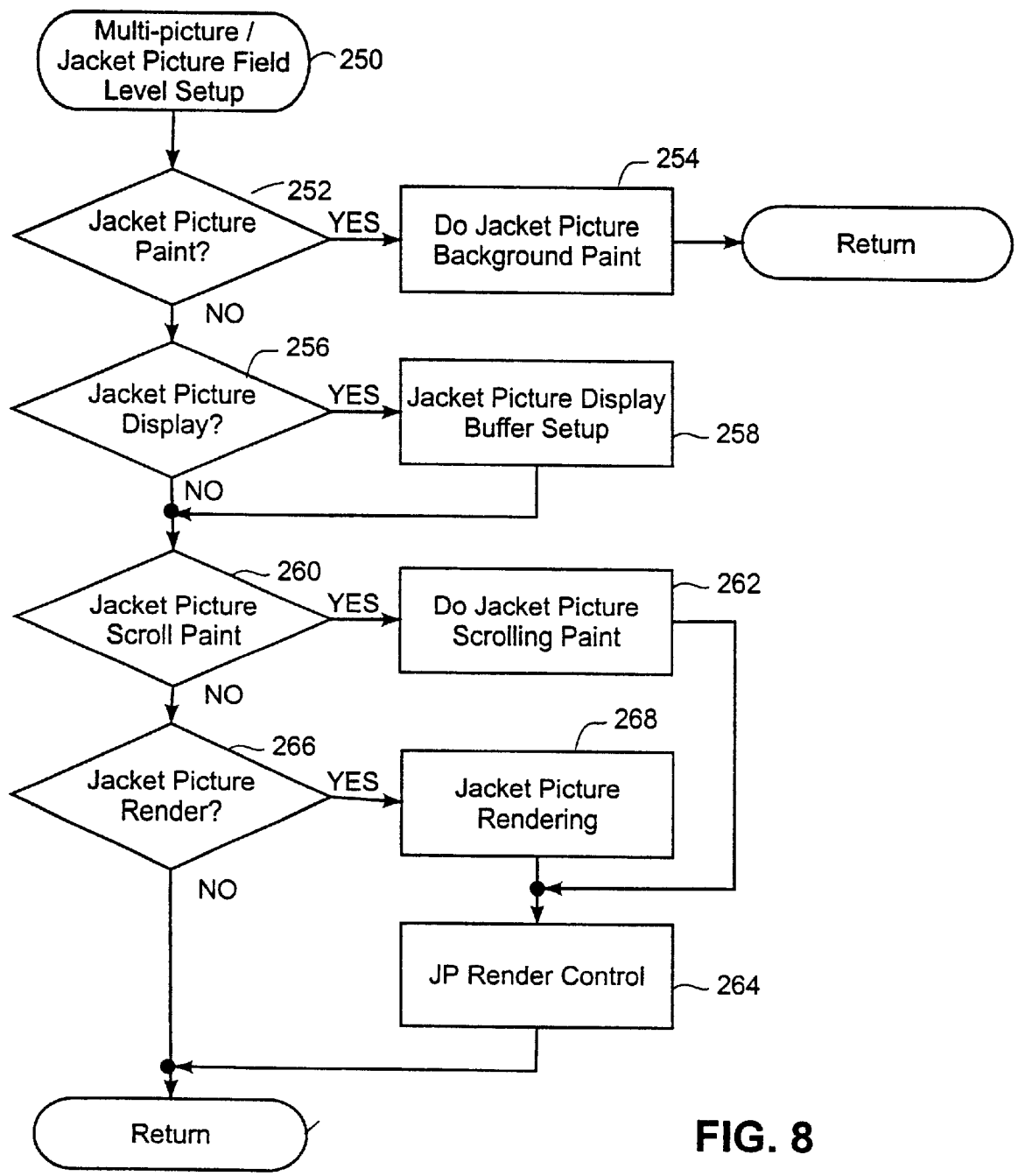
FIG. 8 is a multi-picture/jacket picture field-level setup routine referenced in the top control routine of FIG. 5.

Referring to FIG. 5, if in block 206 real-time mode was not selected, then multi-picture/jacket picture field-level setup routine 250 is performed, as shown in more detail in FIG. 8. This mode is to achieve non-real time graphic applications such as jacket picture and angle picture. If multi-picture mode (although it may show only one picture) is selected by master control 166, display master control will switch to this mode. Thus, 4:2:2 data from the post filter 110 will be written back to a jacket picture buffer in the buffer memory 48 as discussed above. FIG. 8 shows the four cases for this multi-picture mode. First, if in block 252 jacket picture paint is selected, then jacket picture background paint is done (block 254) by putting one color into the jacket picture buffer. Thus, the whole jacket picture buffer is reset. YUV_RD channel 148 is disabled, so the screen will show full green (or black). After block 254, routine 250 returns.

If jacket picture paint was not selected in block 252, then a determination is made as to whether jacket picture display is selected (block 256). If selected, then jacket picture display buffer is setup (block 258) so that 4:2:2 data from the buffer memory is dumped over the YUV_RD channel 148 through switch 144 to the blender/video encoder 112.

After block 258, or if jacket picture display was not selected in block 256, then a determination is made in block 260 whether jacket picture scroll paint is selected. If so, the selected single color is output over YUV_WR channel 146 to the buffer memory 48, resetting a small portion of the jacket picture buffer (block 262). Then jacket picture render control is called (block 264) wherein the placement of the jacket picture(s) or angle picture(s) is controlled. For example, block 264 could set up for display, a single large jacket, a vertical stack of five jacket pictures, a two-by-two of angle pictures, or a three-by-three of angle pictures. Then routine 250 is done.

Returning to block 260, if jacket picture scroll paint was not selected, then a determination is made as to whether jacket picture render is selected (block 266). If so, the YUV_WR channel 146 is utilized to write back 4:2:2 picture data from the post filter 110 to the buffer memory 48 (block 268). Jacket picture field control is performed to modify the display active area according to the picture size. Then, jacket picture render control is performed (block 264) as discussed above. If in block 260 jacket picture render was not selected, then routine 250 returns.

Returning to FIG. 5 after real-time mode is completed in block 220 or after multi-picture mode is completed in block 250, then the display state machine 178 is performed to setup parameters for the display line control (176, FIG. 1). Display master control 174 uses input/output ratios, 4 or 2-tap filter selection, initial phases, and pre-fetch statuses. Also, the display master control calculates the period for the scan line.

Thus, in block 270, a determination is made as to whether a four-tap vertical filter is to be used. If so, four-tap filter coefficient is setup in block 272, else two-tap vertical filter coefficient is setup in block 274.

After either block 272 or 274, then the memory addresses are calculated so that the display line control will be able to update addresses the field to be scanned line by line (block 276). Moreover, the display master control 174 needs to provide slice address information for the display line control 176.

Figure 9:
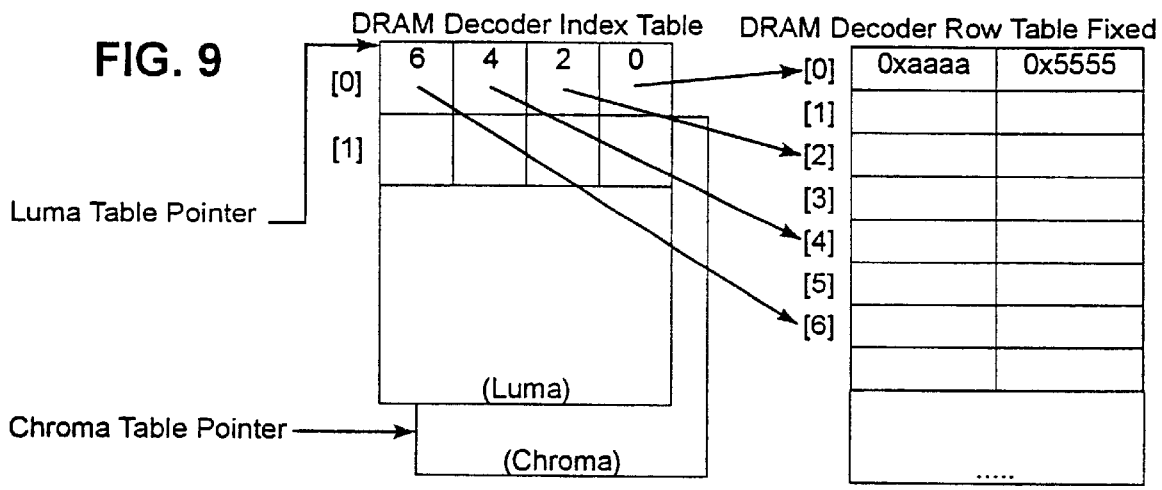
FIG. 9 is a data structure for luma and chroma slice addressing.

Referring to FIG. 9, during the decoding process, all of the slice starting addresses are stored in a DRAM decoder row table fixed table. Each element is 32 bits with the first 16 bits for luma and the last 16 bits for chroma. These addresses are only offset addresses, which means we need to add (shift 5 bits left first) to the base address to have the final slice starting addresses. To address this table, we need to check another table first, a DRAM decoder index table On Screen Display On screen display provides for user interaction with the digital audio/video processor 32. Host application programming interfaces (API) allow for the creation of OSD windows to graphically communicate with users.

Each OSD window includes a rectangular mask upon which may be presented pixel data, such as text characters or graphical controls like buttons rendered for video display. The window also include an OSD color pallette, or color look up table, to define the colors for the mask and pixel data. On screen display also provides for priority of overlaying each mask and for blending the windows with video and subpicture.

Figure 10:
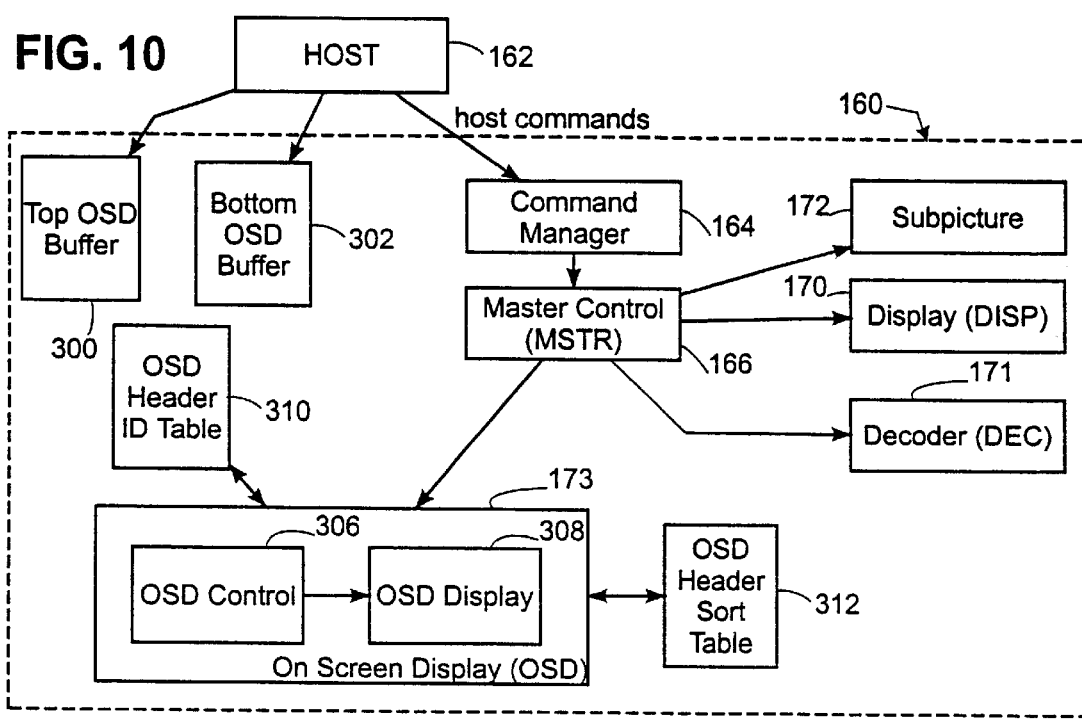
FIG. 10 is a block diagram of software objects within the ASIC device of FIG. 2 providing On Screen Display (OSD) control.

Referring to FIG. 10, a block diagram of software objects within the ASIC device of FIG. 2 providing On Screen Display (OSD) control. Certain aspects shown are similar to the discussion above for FIG. 4 wherein host commands from the host 162 go to command manager 164 to schedule execution by master control 166. Master control 166 sends commands associated with on screen display to the OSD software object 173, as well as subpicture commands to subpicture control 172, display commands to display control 170, and decoder commands to decoder 171. The implementation of the On Screen Display Decoder 106 is further described in copending and commonly assigned application Ser. No. 09/238,376, DISPLAY UNIT ARCHITECTURE, by Taner Ozcelik, et al., filed on Mar. 31, 1999, which application is in its entirety hereby expressly incorporated by reference herein.

The host 162 is responsible for maintaining a top OSD buffer 300 and bottom OSD buffer 302 stored in buffer memory 48, corresponding to the top and bottom display fields into which on screen displays are eventually merged. In these buffers, OSD window data is updated when the buffer does not correspond to the active field. That is, the host can change OSD window data for the bottom OSD buffer 302 when the top field is being output to the video display 42. Also, the host sends commands during the previous field for what the on screen display (OSD) software object 173 is to do during the next field. These OSD commands including activating the OSD software object 173, directing OSD Control 306 to analyze the OSD windows, and OSD Display 308 to direct output of the analyzed OSD windows to the blender/video encoder 112, as will be discussed.

OSD software object 173 locates these buffers 300, 302 by receiving OSD base address and the offset address of the first header within the buffer, from the host 162. OSD software object 173 can also detect the offset address from an OSD window activated by the host 162. The OSD software object calls upon OSD control to analyze the OSD windows data in the respective buffer 300, 302. The OSD software object 173 creates two data segments for sorting and relinking the OSD headers: an OSD header identification (ID) table 310 and an OSD header sort table 312, both stored in Dcache (not shown) within the RISC 120.

Figure 11:
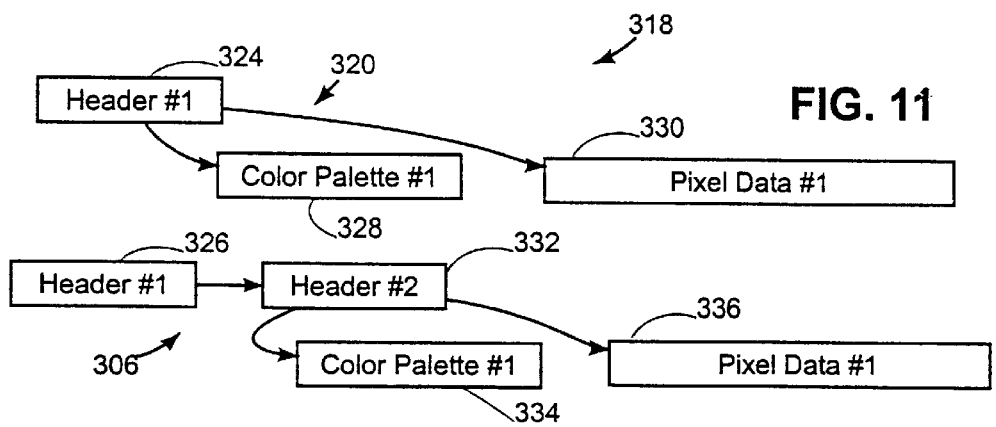
FIG. 11 is an OSD bitstream structure in OSD top and bottom buffers that would be analyzed by the OSD control of FIG. 10.

Referring to FIG. 11, an OSD bitstream structure 318 that would be analyzed by the OSD control 306 is illustrated for a first OSD window header block 320 and a second OSD window header block 322. Such data would be found in the buffers 300, 302. The first header block 320 has a header 324 with three pointers, the first being to a first header 326 of the next header block 322, so that each OSD window can be found. Header 324 also has a pointer to a color pallette 328, or color look up table, defining the color scheme to be used by the OSD window, and a pointer to pixel data 330 defining graphical user interface data to be presented upon the OSD window. The second OSD header block 322 has two headers, illustrating the use of dummy headers to store additional information such as additional color pallettes. Thus, the first header 326 has a pointer to the next header 332 within the same header block 322, but does not point to a color pallette or pixel data. The next header 332 contains these pointers to color pallette 324 and pixel data 326, and would have a pointer to an additional header block if provided.

Figure 12:
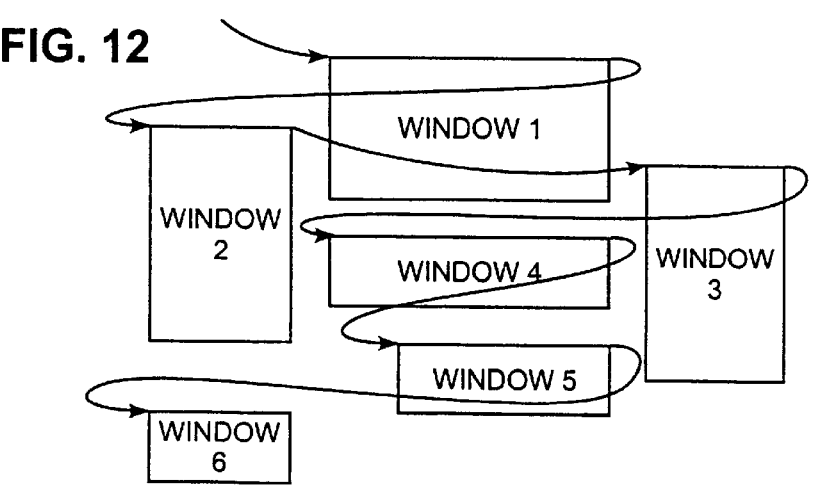
FIG. 12 is a depiction of displayed OSD windows illustrating the linking of each window, with priority given to a window with an upper left starting point which precedes another by being above, or if on the same row, is to the left.

Referring to FIG. 12, each header 324, 326 includes information as to the starting corner of the OSD window which is used by the OSD decoder 106 in generating the OSD video to be blended. This starting corner information is used by the OSD software object 173 to sort the OSD windows. To display OSD windows 1–6 as depicted, a correctly linked OSD window sort table 312 would have a pointer to the upper left corner of the upper most OSD window, corresponding to the OSD window that would first begin to be displayed by the raster pattern of video display 42. Similarly, for windows on the same row, the OSD window with the left most starting corner would be linked first. Typically, the OSD header buffers 300, 302 would include links between each OSD window but they would not be correctly sorted.

Figure 13:
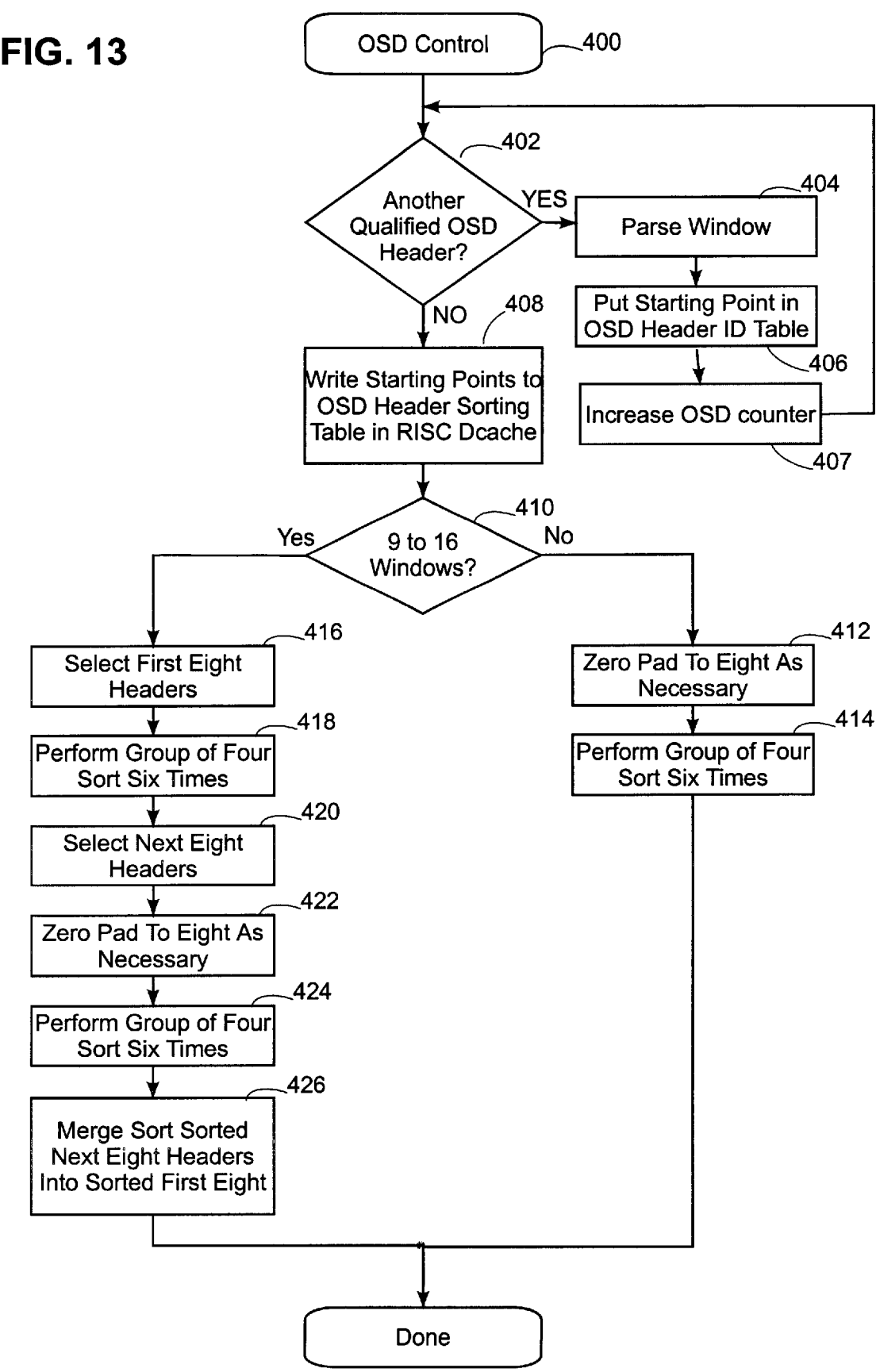
FIG. 13 is a flow diagram of an OSD control routine implemented in the OSD software object of FIG. 10.

Referring to FIG. 13, a flow diagram for an OSD control routine 400 is shown, illustrating the creation of the OSD window ID table 310 and OSD window sort table 312. When the host 162 commands OSD software object 173 to analyze one of the OSD window buffers 300, 302, OSD control 306 uses the OSD base address and header offset data to locate the first header in the buffer 300, 302, following the pointers to each subsequent OSD window until the linked list is located and stored in the OSD window ID table 310.

Thus, in block 402, routine 400 determines whether another qualified OSD header remains to be analyzed. If so, the window is parsed as described above to locate the starting corner, or starting point, of the window (block 404). Then the starting point is placed in the OSD header ID table 310 (block 406). The OSD countered is increased (block 407). Processing then returns to block 402 to test for another window, which would be located by a pointer from the previous window data. If in block 402 no further windows require parsing, then the unsorted and unlinked window starting points are written to the OSD header sort table 312 in the RISC 120 (block 410).

OSD control routine 400 accommodates up to sixteen headers for sorting and linking and the sorting is done in groups of eight. Consequently, a determination is next made as to whether the number of OSD windows is 9 to 16. If not, then the list of headers is zero padded to eight (block 412). Then, groups of four of the eight headers are sorted six times, as will be shown below (block 414). Then, routine 400 is done.

Returning to block 410, if the number of headers to sort was nine to sixteen, then the first eight are selected for sorting (block 416). Then groups of four of the first eight are sorted six times, as will be described below (block 418). Then the next eight are selected (block 420) and zero padded as necessary to achieve a full eight headers (block 422). Then, groups of four of the next eight are sorted six times, as will be described below (block 424). Then the sorted first eight and sorted next eight are merge sorted, linking each header in the OSD header sort table 312 to the sorted condition. An example of merge sorting is comparing the next unlinked header in both the sorted first eight list and sorted next eight list and linking the upper and leftmost one.

Referring to Table 1 below, an illustrative example of sorting eight OSD windows by groups of four is shown. The starting corners are sorted in the following order: (1) the first four, (2) the last four, (3) the middle four, (4) the first four, (5) the last four, and (6) the middle four, after which the list of eight is properly sorted. The advantage is that sorts by four are rapidly implemented in the OSD decoder 173.

TABLE 1

| | | | | | | | |
|---|---|---|---|---|---|---|---|
| First Sort: Group of 4 | <u>18</u> | <u>16</u> | <u>14</u> | <u>10</u> | 10 | 5 | 3 | 1 |
| Second Sort: Group of 4 | 10 | 14 | 16 | 18 | <u>10</u> | <u>5</u> | <u>3</u> | <u>1</u> |
| Third Sort: Group of 4 | 10 | 14 | <u>16</u> | <u>18</u> | <u>1</u> | <u>3</u> | 5 | 10 |
| Fourth Sort: Group of 4 | <u>10</u> | <u>14</u> | <u>1</u> | <u>3</u> | 16 | 18 | 5 | 10 |
| Fifth Sort: Group of 4 | 1 | 3 | 10 | 14 | <u>16</u> | <u>18</u> | <u>5</u> | <u>10</u> |
| Sixth Sort: Group of 4 | 1 | 3 | <u>10</u> | <u>14</u> | <u>5</u> | <u>10</u> | 16 | 18 |
| Sorted Table | 1 | 3 | 5 | 10 | 10 | 14 | 16 | 18 |

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of controlling a reduced instruction set central processing unit to sort on screen display windows, the method comprising:

receiving a list of on screen display window starting points;

sorting said list of starting points by iteratively sorting groups of fewer than all starting points in the list of starting points; and linking on screen display window data in the order of the iteratively sorted list of starting points in an on screen display.

2. The method of claim 1, wherein the small groups comprise four starting points.

3. The method of claim 2, wherein the list of starting points includes eight starting points, and wherein iteratively sorting groups of four comprises sorting the first four in the list, then the last four, then the middle four, then the first four, then the last four, and then the middle four.

4. The method of claim 3, wherein fewer than eight starting points are provided, the method further comprising padding the list of starting points to have eight starting points.

5. The method of claim 3, wherein the list of starting points further includes a second eight starting points, and wherein iteratively sorting groups of four further comprises sorting the first four in the second eight starting points, then the last four, then the middle four, then the first four, then the last four, and then the middle four, the method further including merge sorting the sorted first eight and the second eight starting points.

6. A reduced instruction set processor of a digital audio/video system, the processor comprising:

a memory including a list of starting points of a plurality of screen display windows; and a program resident in memory and configured to access the list of starting points, to sort the list of starting points by iteratively sorting groups of fewer than all starting points in the list of starting points, and to link the screen display windows in the order of the iteratively sorted list of starting points.

7. The reduced instruction set processor of claim 6, wherein the processor is further configured to iteratively sort the list of starting points in small groups of four starting points.

8. The reduced instruction set processor of claim 7, wherein the list of starting points includes eight starting points, and wherein the program is further configured to iteratively sort groups of four starting points by sorting the first four in the list, then the last four, then the middle four, then the first four, then the last four, and then the middle four.

9. The reduced instruction set processor of claim 8, wherein the program is further configured to pad the list of starting points to have eight starting points in response to being provided fewer than eight starting points.

10. The reduced instruction set processor of claim 8, wherein the list of starting points further includes a second eight starting points., and wherein the program is further configured to iteratively sort groups of four by sorting the first four in the second eight starting points, then the last four, then the middle four, then the first four, then the last four, and then the middle four, and then merge sorting the sorted first eight and the second eight starting points.

11. A method of reducing management burden on a host processor of a digital video system with a reduced instruction set central processing unit by sorting, the method comprising:

decoding a digital video signal in response to a host command;

receiving a list of on screen display window starting points from the host processor;

sorting the list of starting points by iteratively sorting groups of fewer than all starting points in the list of starting points;

linking on screen display window data in the order of the iteratively sorted list of starting points; and merging for display the decoded digital video signal and the linked screen display windows.

12. The method of claim 11, wherein the groups comprise four starting points.

13. The method of claim 12, wherein the list of starting points includes eight starting points, and wherein iteratively sorting groups of four comprises sorting the first four in the list, then the last four, then the middle four, then the first four, then the last four, and then the middle four.

14. The method of claim 13, wherein fewer than eight starting points are provided in the list, the method further comprising padding the list of starting points to have eight starting points.

15. The method of claim 13, wherein the list of starting points further includes a second eight starting points, and wherein iteratively sorting groups of four further comprises sorting the first four in the second eight starting points, then the last four, then the middle four, then the first four, then the last four, and then the middle four, the method further including merge sorting the sorted first eight and the second eight starting points.

* * * * *

UNITED STATES PATENT AND TRADEMARK OFFICE
CERTIFICATE OF CORRECTION

PATENT NO. : 6,493,005 B1
DATED : December 10, 2002
INVENTOR(S) : Wu

It is certified that error appears in the above-identified patent and that said Letters Patent is hereby corrected as shown below:

Column 3,
Line 67, reads "Slices-of" and should read -- Slices of --.

Column 4,
Line 5, reads "that-contains" and should read -- that contains --.
Line 65, reads "4:2:2.format" and should read -- 4:2:2 format --.

Column 8,
Line 50, reads "bus I 16" and should read -- bus 116. --

Column 9,
Line 56, reads "to the mix." and should read -- to the mix -- (there should be no period after "mix").

Column 10,
Line 16, beginning with "controller pre-horizontal" through Column 10, line 51, ending with "buffer memory 48." is in the wrong place. This whole section should be placed in Column 11, before line 18 beginning with "Then a determination is made". It seems that page 21 was printed before page 20.

Column 14,
Lines 45, 47, 51 and 55, reads "comer" and should read -- corner --.

Column 15,
Line 4, reads "comer" and should read -- corner --.

UNITED STATES PATENT AND TRADEMARK OFFICE
CERTIFICATE OF CORRECTION

PATENT NO. : 6,493,005 B1
DATED : December 10, 2002
INVENTOR(S) : Wu

It is certified that error appears in the above-identified patent and that said Letters Patent is hereby corrected as shown below:

Column 16,
Line 51, reads "points.," and should read -- points, --.

Signed and Sealed this

Twenty-third Day of September, 2003

JAMES E. ROGAN
*Director of the United States Patent and Trademark Office*